Patented Apr. 11, 1950

2,503,972

UNITED STATES PATENT OFFICE 2,503,972

PRODUCTION OF POLYCYCLOPENTADIENE COMPOSITIONS

John Kenson Simons, Toledo, Ohio, assignor to Libbey-Owens-Ford Glass Company, Toledo, Ohio, a corporation of Ohio No Drawing. Application August 27, 1946, Serial No. 693,384

1 Claim. (Cl. 260—93.1)

The invention relates to the production of useful resinous compositions from cyclopentadiene.

Thermosetting cyclopentadiene polymers produced by known methods are of comparatively low molecular weight and are very tacky and sticky. As a result, the known polymers do not lend themselves readily to milling, and other ingredients can be added only with difficulty by the cruder and more expensive kneading processes, e. g., by the use of Banbury mixers.

The principal object of the invention is the production of resinous polycyclopentadiene compositions by an improved method in which the compositions can be milled like crude rubber.

Another object of the invention is the production of polymers of cyclopentadiene which have increased toughness and high molecular weight.

Still another object of the invention is the polymerization of substantially 100 per cent cyclopentadiene, i. e., without the use of substantial proportions of solvents or diluents.

In accordance with the present invention a polymer is produced by subjecting cyclopentadiene to the action of a mild polymerization catalyst at a low temperature and subsequently milling to incorporate other ingredients necessary in the production of a useful resinous composition.

A secondary aspect of the invention consists in the carrying out of the polymerization at a temperature below 0° C. This is based upon the discovery that 0° C. is a critical point below which polymerization of cyclopentadiene alone or in solution, although it takes place more slowly, produces a polymer that possesses noticeably increased toughness and, therefore, appears to have a higher molecular weight than polymers produced by polymerization at higher temperatures. Another aspect of the invention consists in the use of a specific mild polymerization catalyst in the polymerization of substantially 100 per cent cyclopentadiene at a low temperature.

The specific mild polymerization catalyst consists in a complex of boron fluoride with an ether. Boron fluoride cannot be used in the form of a solution in a hydroxylic solvent such as an alcohol for the polymerization of cyclopentadiene because the hydroxylic solvent reacts with the boron fluoride and renders it inactive as a catalyst. However, the complex of boron fluoride with an ether is a mild and controllable catalyst for the polymerization of cyclopentadiene. Any desired ether may be used since the formation of a complex with boron fluoride is a characteristic of the ether linkage, and since any such complex is capable of controllably catalyzing the polymerization of cyclopentadiene.

Polymers produced from substantially 100 per cent cyclopentadiene are preferable for milling since as an economic factor solvents and diluents need not be removed from the polymer before the milling process, but mainly since polymers produced from substantially 100 per cent cyclopentadiene are extremely tough and hence are readily applicable to milling. However, the complex of boron fluoride and an ether may be dissolved in pure cyclopentadiene or in a solution of cyclopentadiene in a non-hydroxylic solvent. The polymers produced in solvents are more applicable to uses in coating and lacquer compositions, and any desired non-hydroxylic solvent may be employed such as benzene, xylene, High Flash naphtha, solvent naphtha, carbon tetrachloride, and other hydrocarbon or halogenated hydrocarbon solvents.

Since liquid monomeric cyclopentadiene at room temperatures is transformed into dicyclopentadiene, the usual starting material which is available commercially is dicyclopentadiene, the form that is stable at ordinary temperatures. The dicyclopentadiene form may be used for the polymerization in carrying out the present invention, but a polymer of higher molecular weight is obtained by starting with monomeric cyclopentadiene. The commercial dicyclopentadiene is converted to monomeric cyclopentadiene by distilling at atmospheric temperature. At the boiling point of 175° C., the conversion to monomeric cyclopentadiene is about 90% complete, a loss of 10% occurring by the formation of a residue of higher polycyclopentadienes remaining in the distilling flask.

After the polymerization has been carried out, it is desirable to remove the catalyst in order to prevent darkening of the polymer. The preferred method of removing the catalyst consists in adding milk of magnesia and then dehydrating by adding anhydrous sodium sulfate or by adding xylene and distilling off the water. After such removal of the catalyst by means of milk of magnesia, the solution is filtered.

Milling is a process in which a natural or synthetic resinous material is worked between rolls so as to incorporate into it any other ingredients (such as fillers, lubricants, inhibitors, vulcanizing agents or accelerators) in order to produce a resinous composition, usually for molding purposes. The cyclopentadiene polymers of the preferred embodiments of the invention are particularly applicable to milling because they are decidedly tougher and possess sufficiently higher molecular weights than previously known polymers of cyclopentadiene, which are too tacky to be milled on rolls.

In milling, fillers such as those used with natural rubber, e. g., zinc oxide, may be incorporated and any of the usual lubricants may be added. Plasticizers may also be incorporated by milling. Since cyclopentadiene polymers are air-drying, it is preferable to incorporate as inhibitors suitable antioxidants as, e. g., diphenylamine. Also, vulcanizing agents such as sulphur and the ordinary vulcanizing accelerators used with natural rubber may be incorporated in milling, and the resulting compositions may be vulcanized according to the procedures used with natural rubber.

When a solution of the polymer is desired, antioxidants may be added after the removal of the catalyst in order to inhibit coloring of the polymer. Also the viscosity of the solution may be increased by blowing air through it. If the air contains acid vapors its passage through the solution of the polymer causes very rapid increase in viscosity, but also causes darkening of the solution.

*Example 1*

Dicyclopentadiene is distilled at atmospheric pressure, the monomer being collected in a receiver at −78° C. to prevent reformation of the dimer. During such distillation a stream of carbon dioxide is preferably passed through the distillation flask and the condenser. 500 cc. of monomeric cyclopentadiene so prepared, 2.0 cc. of a saturated solution of boron fluoride in ethyl ether, and 1200 cc. of carbon tetrachloride are mixed and then kept at 25° to 35° C. for two hours. The resulting solution is then neutralized with milk of magnesia, and after agitation with an excess of anhydrous sodium sulfate, filter aid is added and the solution is filtered. The resulting colorless solution gives clear films on baking.

*Example 2*

.8 gram of boron fluoride dissolved in 10 cc. of ethyl ether is added to 200 cc. of monomeric cyclopentadiene and the solution is held at 15°–20° below 0° C. for several hours. The resulting polymer is very tough and appears to be of higher molecular weight than the polymer produced in accordance with Example 1.

*Example 3*

2 grams of boron fluoride dissolved in 20 cc. of ethyl ether and 500 cc. of benzene are added to 500 cc. of monomeric cyclopentadiene. After several hours at a temperature between −10° and 0° C., a polymer is obtained which is tougher than the polymer produced in accordance with Example 1, but not as tough as the polymer produced in accordance with Example 2.

*Example 4*

The solution of the polymer produced in accordance with Example 3 is poured into alcohol to precipitate the resin and part of the solvent is kneaded out of the mass which precipitated. The resulting mass or the polymer produced in accordance with Example 2 is milled on rubber rolls. The temperature of the rolls is controlled, if necessary, to hold the temperature of the polymer between room temperature and about 50° C. Other ingredients (such as fillers, lubricants, inhibitors, vulcanizing agents, and accelerators) are incorporated during the milling to give the desired resinous polycyclopentadiene composition. The milling is continued until all the added ingredients have been incorporated into a rubber-like homogeneous mass. The polymer produced in accordance with Example 2 is better for milling than the polymer precipitated from the solution.

This is a continuation-in-part of application Serial No. 444,687, filed May 27, 1942, and now abandoned.

Having described the invention, I claim:

In a process of polymerizing cyclopentadiene to obtain a synthetic rubbery material adaptable for milling on rolls, the step which consists of carrying out the polymerization of 100 per cent cyclopentadiene at a temperature below 0° C. in the presence of a complex of boron fluoride and an ether.

JOHN KENSON SIMONS.

REFERENCES CITED

The following references are of record in the file of this patent:

UNITED STATES PATENTS

| Number | Name | Date |
|---|---|---|
| 2,359,810 | Trepps | Oct. 10, 1944 |
| 2,387,624 | Trepp | Oct. 23, 1945 |

OTHER REFERENCES

Staudinger: Annalen 447, page 11 (1926).